(12) United States Patent
Liao

(10) Patent No.: US 7,876,515 B2
(45) Date of Patent: Jan. 25, 2011

(54) CAMERA MODULE

(75) Inventor: Chia-Hung Liao, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/541,370

(22) Filed: Aug. 14, 2009

(65) Prior Publication Data

US 2010/0149666 A1    Jun. 17, 2010

(30) Foreign Application Priority Data

Dec. 11, 2008    (CN) .......................... 2008 1 030615

(51) Int. Cl.
G02B 7/02    (2006.01)
G02B 15/14    (2006.01)
(52) U.S. Cl. ..................... 359/824; 359/814; 359/694
(58) Field of Classification Search ......... 359/694–700, 359/811–824; 396/79, 85, 133, 75; 348/345, 348/374, 376
See application file for complete search history.

(56) References Cited

U.S. PATENT DOCUMENTS

| 7,688,521 | B2* | 3/2010 | Chou | 359/694 |
| 7,746,579 | B2* | 6/2010 | Ke | 359/814 |
| 2008/0309812 | A1* | 12/2008 | Chen et al. | 348/340 |
| 2010/0123960 | A1* | 5/2010 | Liao | 359/824 |

* cited by examiner

Primary Examiner—Mohammed Hasan
(74) Attorney, Agent, or Firm—Raymond J. Chew

(57)    ABSTRACT

A camera module includes a barrel unit, an image sensing unit, and a voice coil motor. The image sensing unit has an image sensing surface. The barrel unit defines an optical axis. A first projection boundary is formed on the projection plane by projecting a boundary of the image sensing surface along the optical axis. A second projection boundary is formed on the projection plane by projecting a boundary of the receiving space of the movable part along the optical axis. The voice coil motor includes a hollow fixed part, a movable part, and a base. The base includes a shielding part and a through hole defined in the shielding part. A third projection boundary is formed on the projection plane by projecting a boundary of the through hole of the shielding part. The third projection boundary lies between the first and the second boundaries.

15 Claims, 5 Drawing Sheets

CAMERA MODULE

BACKGROUND

1. Technical Field

The present disclosure relates to imaging technology, and more particularly to a camera module.

2. Description of Related Art

Nowadays, camera modules have been widely used in various portable electronic devices. A typical camera module includes a barrel unit having lenses therein, a voice coil motor, and an image sensor. The voice coil motor includes a fixed part and a movable part. The movable part is engaged with the barrel unit.

In assembly, the voice coil motor is first assembled with the image sensor, and then the barrel unit is threadingly coupled to the movable part of the voice coil motor. In this step, dusts and small particles may be generated due to friction, and may fall on the image sensor. Accordingly, such contaminants may cause the imaging quality of the camera module to be unsatisfactory.

Therefore, a new camera module is desired to overcome the above mentioned problems.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Embodiments will now be described in detail below with reference to the drawings.

Figure 1:
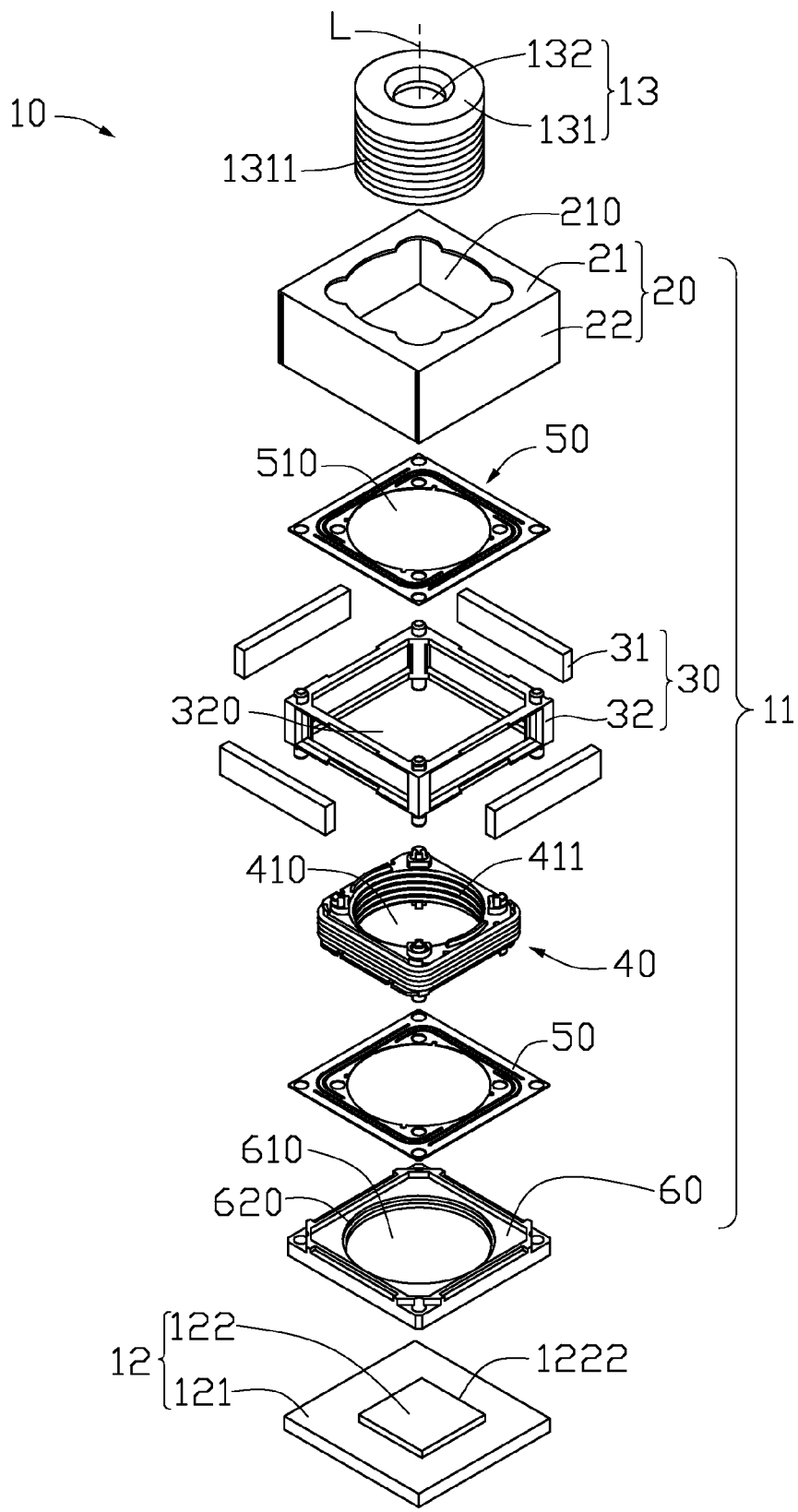
FIG. 1 is an exploded, isometric view of a camera module according to a first embodiment.
Figure 2:
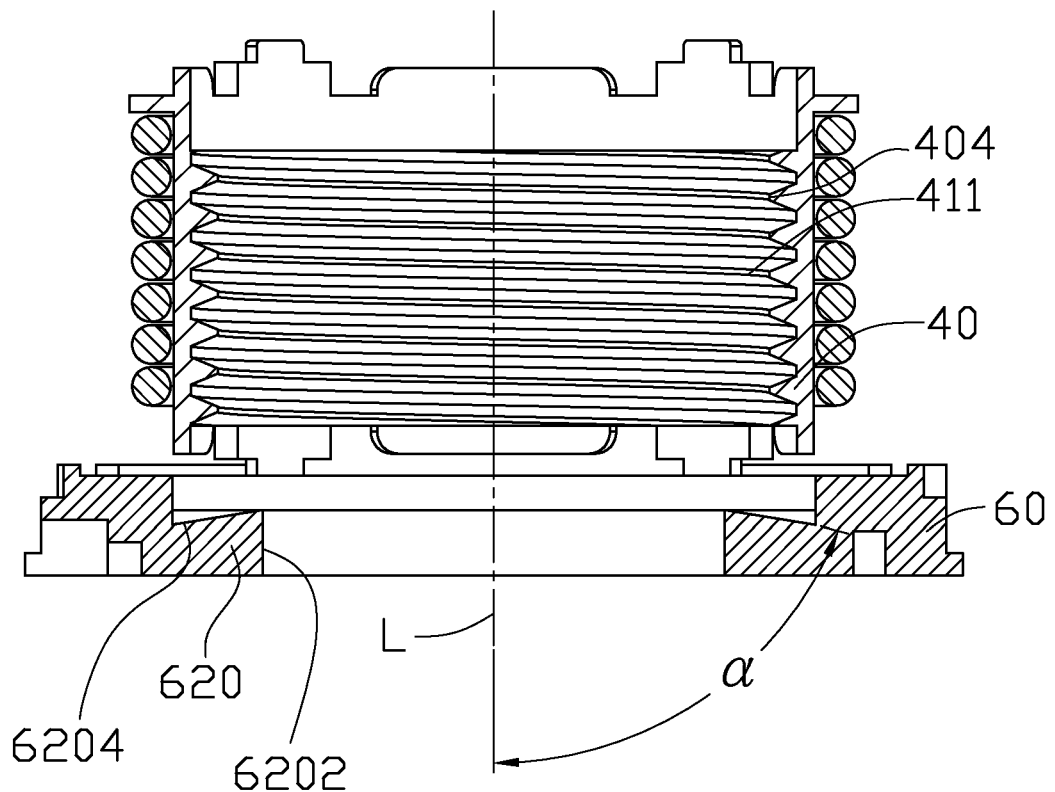
FIG. 2 is an assembled cross-sectional view of a base and movable part of the camera module of FIG. 1.
Figure 3:
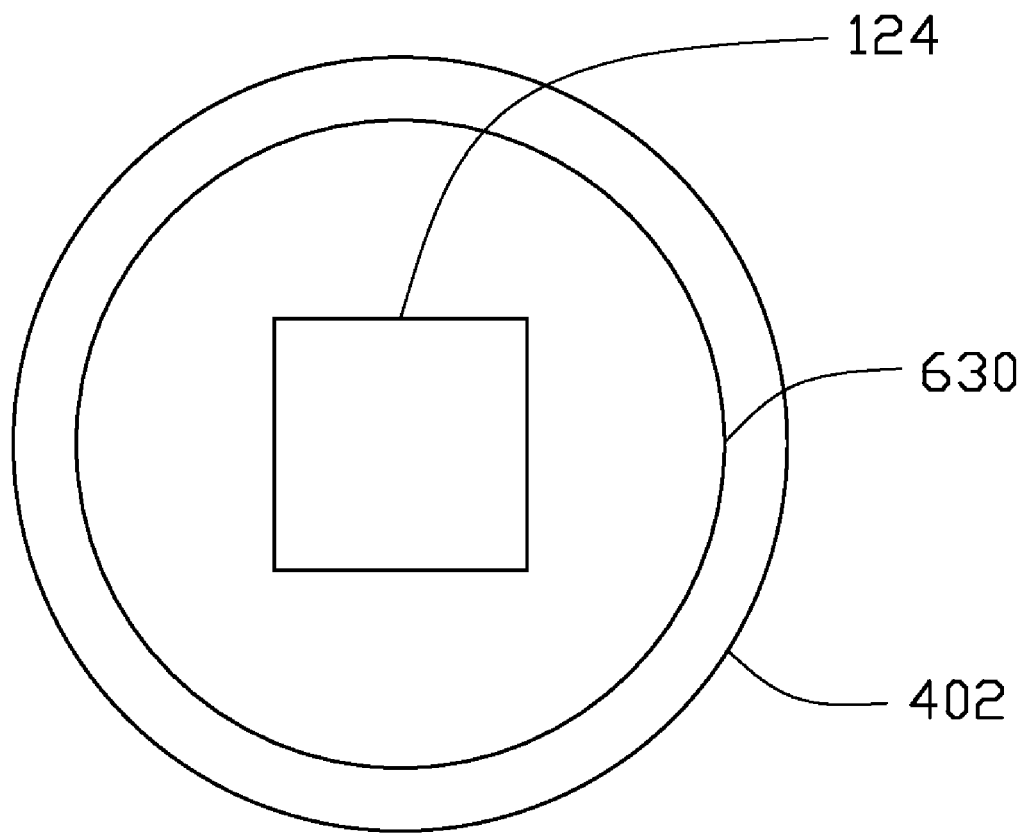
FIG. 3 is a schematic view of a first projection boundary, a second projection boundary, and a third projection boundary on a projection plane, which are respectively corresponding to a boundary of an image sensing surface, a boundary of a receiving space of a movable part, and a boundary of a through hole of the base of FIG. 1.

Referring to FIGS. 1 to 3, a camera module 10 according to a first embodiment includes a voice coil motor 11, a barrel unit 13 and an image sensor 12. The voice coil motor 11 is configured for driving the barrel unit 13 to move along an optical axis L thereof such that a clear desired image can be formed on the image sensor 12. The image sensor 12 includes a substrate 121 and an image sensing unit 122 disposed on the substrate 121. A top surface of the image sensing unit 122 is an effective image sensing surface, and the effective image sensing surface has a boundary 1222.

The barrel unit 13 includes a barrel 131 and a plurality of lenses 132 received in the barrel 131. A plurality of external threads 1311 are formed on an outer surface of the barrel 131.

The voice coil motor 11 includes a housing 20, a fixed part 30, a movable part 40, two elastic members 50 and a base 60.

The housing 20 is configured for shielding the voice coil motor 11 from outside electromagnetic interference. The housing 20 includes a top plate 21 and a sidewall 22 perpendicular to the top plate 21. The top plate 21 and the side plate 22 cooperatively define a chamber for receiving the fixed part 30, the movable part 40, and the elastic member 50. The top plate 21 defines an opening 210 at a center thereof so that light can enter through the opening 210 and go into the barrel unit 13.

The fixed part 30 includes a frame 32 and a plurality of magnets 31 mounted on the frame 32. The frame 32 defines a first receiving space 320 for accommodating the movable part 40.

The movable part 40 has a cylindrical second receiving space 410 for receiving the barrel unit 13. The movable part 40 includes a plurality of internal threads 411 formed on an inner surface thereof. The barrel unit 13 is threadibly coupled to the movable part 40 via the external threads 1311 and the internal threads 411.

Each elastic member 50 has an opening 510 defined at a center thereof. The opening 510 allows light to pass through. Each elastic member 50 is fixed with the movable part 40 and the frame 32. In the present embodiment, each elastic member 50 is a flat spring plate.

The base 60 includes a shielding part 620 and a through hole 610 defined at a center of the shielding part 620. The through hole 610 allows light to pass the barrel unit 13 and reach the image sensor 12. An included angle α formed between a top surface 6204 of the shielding part 620 and the optical axis L is less than 90 degrees. An inner diameter of the through hole 610 is less than that of the second receiving space 410 of the movable part 40. The through hole 610 is coaxially aligned with the second receiving space 410 of the movable part 40.

A first projection boundary 124 is formed on a projection plane (e.g., a top surface of the substrate 121 of the image sensor 12) by projecting the boundary 1222 of the effective image sensing surface of the image sensing unit 122 along the optical axis L. The projection plane is perpendicular to the optical axis L. A second projection boundary 402 is formed on the projection plane by projecting an inner surface 404 (i.e., a boundary of the second receiving space 410) of the movable part 40 along the optical axis L. A third projection boundary 630 is formed on the projection plane by projecting a boundary of the through hole 610 of the base 60 (i.e., an inner surface 6202 of the shielding part 620) along the optical axis L. The third projection boundary 630 lies between the first and the second boundaries 124, 402.

In assembly, when the barrel unit 13 is threadingly coupled to the movable part 40, small particles and dusts may be generated due to a friction between the barrel unit 13 and the movable part 40. The small particles and dusts will fall onto the shielding part 620 such that the shielding part 620 blocks such contaminants from falling onto the image sensor 12. It is to be understood that as long as the third projection boundary 630 lies between the first and the second boundaries 402, 124, the shielding part 620 can prevent the image sensor 12 from being contaminated.

Alternatively, the shielding part 620 can be a discontinuous ring shape, square, or rectangular. Also alternatively, the included angle α can be 90 degrees.

Figure 4:
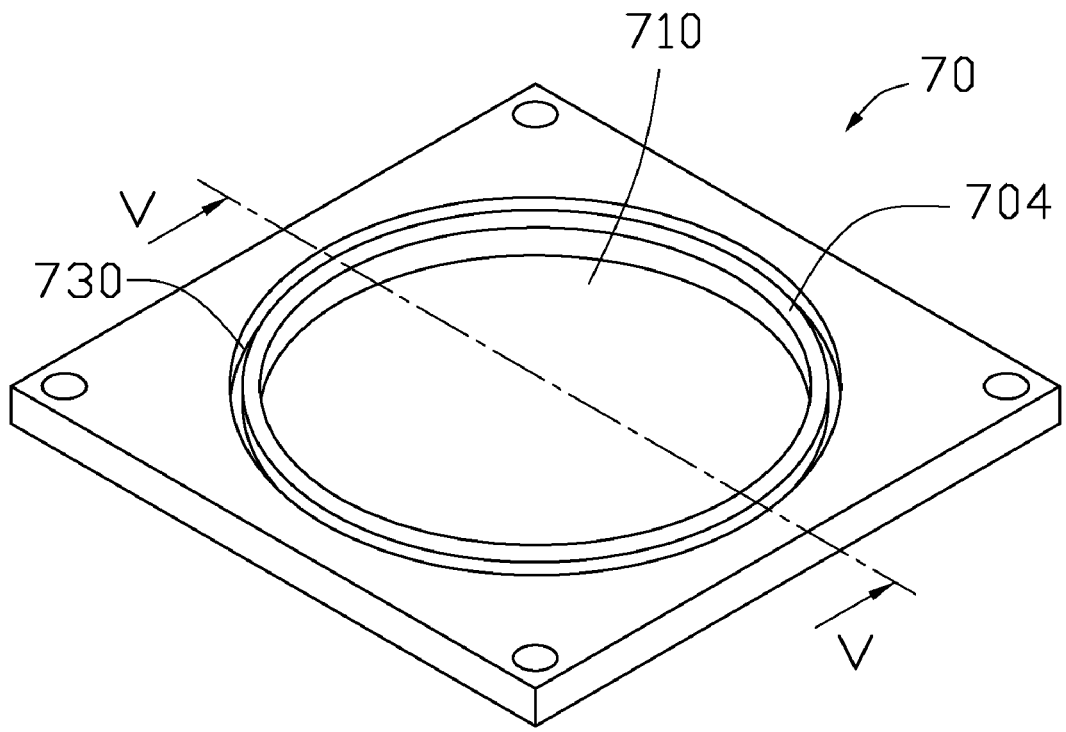
FIG. 4 is an isometric view of a base according to a second embodiment.
Figure 5:
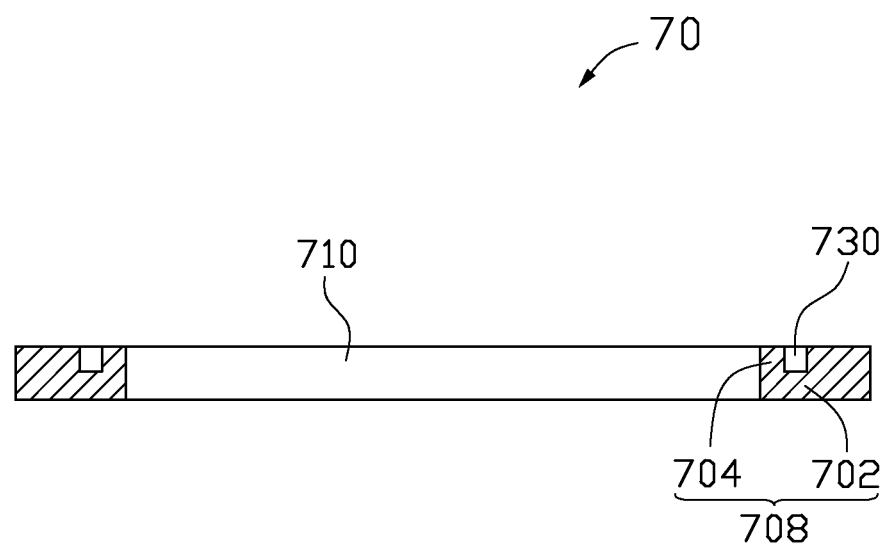
FIG. 5 is a cross-sectional view of the base of FIG. 4 taken along the line V-V thereof.

Referring to FIGS. 4-5, a base 70 according to a second embodiment is shown. The base 70 includes a shielding part 708, a through hole 710 defined in the shielding part 708, and a cylindrical groove 730 defined therein. The base 70 is similar to the base 60 of the first embodiment, except that the shielding part 708 includes a flat portion 702 extending from an inner surface thereof and a ring-shaped protrusion 704 extending perpendicular to the flat portion 702.

While certain embodiments have been described and exemplified above, various other embodiments from the foregoing disclosure will be apparent to those skilled in the art. The present invention is not limited to the particular embodiments described and exemplified but is capable of considerable variation and modification without departure from the scope of the appended claims.

What is claimed is:

1. A camera module comprising:
a barrel unit comprising a barrel and a plurality of lenses received in the barrel, the barrel unit defining an optical axis;
an image sensing unit having an image sensing surface, a boundary of the image sensing surface forming a first projection boundary on a projection plane by projecting along the optical axis, wherein the projection plane is perpendicular to the optical axis; and
a voice coil motor comprising:
a hollow fixed part;
a movable part movably received in the fixed part, the movable part having a receiving space defined therein, the barrel being engaged in the receiving space, a boundary of the receiving space of the movable part forming a second projection boundary on the projection plane by projecting along the optical axis; and
a base comprising a shielding part and a through hole defined in the shielding part, a boundary of the through hole forming a third projection boundary on the projection plane by projecting along the optical axis, wherein the third projection boundary is located between the first and the second projection boundaries.

2. The camera module of claim 1, wherein the shielding part is ring-shaped.

3. The camera module of claim 1, wherein the shielding part is a discontinuous ring.

4. The camera module of claim 1, wherein the shielding part comprises an annular top surface facing the movable part, the top surface slanted outwardly.

5. The camera module of claim 4, wherein an included angle formed between the top surface and the optical axis is less than or equal to 90 degrees.

6. The camera module of claim 1, wherein the shielding part comprises a flat portion and an annular protrusion perpendicularly extending from the flat portion.

7. A camera module comprising:
a barrel unit comprising a barrel and a plurality of lenses received in the barrel, the barrel unit defining an optical axis;
an image sensing unit comprising an image sensor having a sensing surface optically aligned with the lenses; and
a voice coil motor comprising:
a hollow fixed part;
a movable part movably received in the fixed part, the movable part having a first through hole, the barrel being engaged in the first through hole; and
a base interposed between the movable part and the image sensor, the base comprising a shielding part and a second through hole defined in the shielding part, the second through hole coaxially aligned with the first through hole, the second through hole having a diameter less than that of the first through hole.

8. The camera module of claim 7, wherein the shielding part is ring-shaped.

9. The camera module of claim 7, wherein the shielding part is a discontinuous ring.

10. The camera module of claim 7, wherein the shielding part comprises an annular top surface facing the movable part, the top surface slanted outwardly.

11. The camera module of claim 10, wherein an included angle formed between the top surface and the optical axis is less than or equal to 90 degrees.

12. The camera module of claim 7, wherein the shielding part comprises a flat portion and an annular protrusion perpendicularly extending from the flat portion.

13. A camera module comprising:
a barrel unit comprising a barrel and a plurality of lenses received in the barrel, the barrel unit defining an optical axis;
an image sensing unit having an image sensing surface, a boundary of the image sensing surface forming a first projection boundary on a projection plane by projecting along the optical axis, wherein the projection plane is perpendicular to the optical axis; and
a voice coil motor comprising:
a hollow fixed part;
a movable part movably received in the fixed part, the movable part having a receiving space defined therein, the barrel being engaged in the receiving space, a boundary of the receiving space of the movable part forming a second projection boundary on the projection plane by projecting along the optical axis; and
a base comprising a shielding part and a through hole defined in the shielding part, a boundary of the through hole forming a third projection boundary on the projection plane by projecting along the optical axis, wherein the third projection boundary is located between the first and the second projection boundaries, the shielding part comprises an annular top surface facing the movable part, and the top surface slants outwardly.

14. The camera module of claim 13, wherein the shielding part is ring-shaped.

15. The camera module of claim 13, wherein an included angle formed between the top surface and the optical axis is less than or equal to 90 degrees.

* * * * *